US006637280B2

(12) United States Patent
Potts

(10) Patent No.: US 6,637,280 B2
(45) Date of Patent: Oct. 28, 2003

(54) VARIABLE VIBRATORY MECHANISM

(75) Inventor: Dean R. Potts, Maple Grove, MN (US)

(73) Assignee: Caterpillar Paving Products Inc, Minneapolis, MN (US)

(*) Notice: Subject to any disclaimer, the term of this patent is extended or adjusted under 35 U.S.C. 154(b) by 63 days.

(21) Appl. No.: 09/999,523

(22) Filed: Oct. 31, 2001

(65) Prior Publication Data

US 2003/0079559 A1 May 1, 2003

(51) Int. Cl.[7] .................................... F16H 33/10
(52) U.S. Cl. ............................ 74/87; 74/61; 404/113; 404/117
(58) Field of Search ............................ 74/87, 86, 61; 404/113, 117, 122, 133.1, 133.2

(56) References Cited

U.S. PATENT DOCUMENTS 3,105,424 A 10/1963 Dion et al.
3,192,839 A 7/1965 Vivier
3,590,702 A * 7/1971 Sechi ......................... 404/117
3,670,631 A 6/1972 Gaylord
4,105,356 A * 8/1978 Loveless ..................... 404/117
4,201,493 A 5/1980 Braun
4,221,499 A * 9/1980 Breitholz et al. ........... 404/117
4,350,460 A 9/1982 Schmelzer et al.
4,481,835 A 11/1984 Storm
4,568,218 A * 2/1986 Orzal ......................... 404/117
4,586,847 A * 5/1986 Stanton ...................... 404/117
5,082,396 A 1/1992 Polacek
5,248,216 A * 9/1993 Vural .......................... 404/75
5,397,198 A * 3/1995 Bertrand ..................... 404/117
5,618,133 A * 4/1997 Mitsui et al. ............... 404/117
5,727,900 A * 3/1998 Sandstrom ................. 404/84.1
5,797,699 A 8/1998 Blancke et al.

* cited by examiner

*Primary Examiner*—Jack Lavinder
*Assistant Examiner*—Mariano Sy
(74) *Attorney, Agent, or Firm*—Jeff A Greene

(57) ABSTRACT

A vibratory mechanism is provided with first and second motors connected to first and second eccentric weights. One of the first and second motors is operable to change a phase difference between the first and second eccentric weights to change a vibration amplitude.

14 Claims, 5 Drawing Sheets

VARIABLE VIBRATORY MECHANISM

TECHNICAL FIELD

This invention relates generally to a vibratory compactor machines and, more particularly, to an infinitely variable amplitude and frequency vibratory mechanism.

BACKGROUND

Vibratory compactor machines are commonly employed for compacting freshly laid asphalt, soil, and other compactable materials. For example these compactor machines may include plate type compactors or rotating drum compactors with one or more drums. The drum type compactor functions to compact the material over which the machine is driven. In order to compact the material the drum assembly includes a vibratory mechanism including inner and outer eccentric weights arranged on a rotatable shaft within the interior cavity of the drum, for inducing vibrations on the drum.

The amplitude and frequency of the vibratory forces determine the degree of compaction of the material, and the speed and efficiency of the compaction process. The amplitude of the vibration forces is changed by altering the position of a pair of weights with respect to each other. The frequency of the vibration forces is managed by controlling the speed of a drive motor in the compactor drum.

The required amplitude of the vibration force may vary depending on the characteristics of the material being compacted. For instance, high amplitude works best on thick lifts or harsh mixes, while low amplitude works best on thin lifts and soft materials. Amplitude variation is important because different materials require different levels of compaction. Moreover, a single compacting process may require different amplitude levels because higher amplitude may be required at the beginning of the process, and the amplitude may be gradually lowered as the process is completed.

Conventional vibratory compactor machines are problematic in that the amplitude and frequency of the vibration force can only be set to certain predetermined levels, or the mechanisms for adjusting the vibration amplitude are complex. One such vibratory mechanism is disclosed in U.S. Pat. No. 4,350,460 issued to Lynn A. Schmelzer et al. on Sep. 21, 1982 and assigned to the Hyster Company.

The present invention is directed to overcome one or more of the problems as set forth above.

SUMMARY OF THE INVENTION

According to one aspect of the invention a vibratory mechanism is provided that includes a first eccentric weight and a second eccentric weight being coaxially rotatable with the first eccentric weight. A first motor is connected with the first eccentric weight and a second motor is connected with the first second eccentric weight. One of the first and second motors is operable to change a phase difference between the first and second eccentric weights.

According to another aspect of the invention a method for adjusting the amplitude of a vibratory mechanism is provided. The vibratory mechanism includes first and second eccentric weights, a first motor connected to the first weight and a second motor connected to the second weight respectively via output shafts. A first driving step includes driving the first and second motors at the same speed and a second driving step includes driving one of the first and second motors, at a desired time, faster than the other motor to change a phase difference between the first and second eccentric weights in order to change a vibration amplitude.

DETAILED DESCRIPTION

Figure 1:
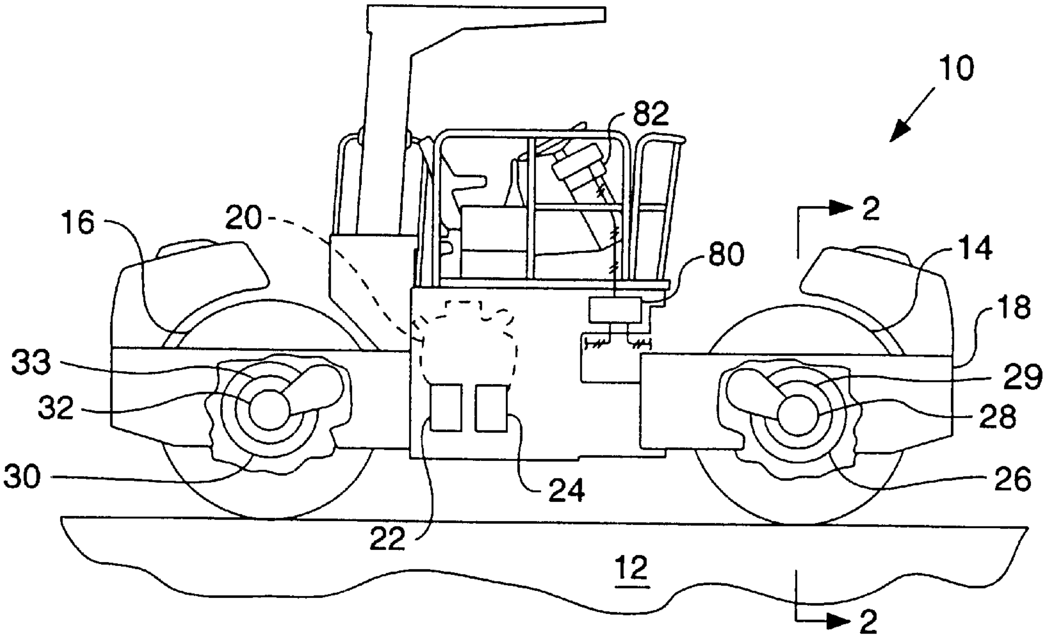
FIG. 1 is a side elevational view of a work machine embodying the present invention.

A work machine 10, for increasing the density of a compactable material 12 or mat such as soil, gravel, or bituminous mixtures, an example of which is shown in FIG. 1. The work machine 10 is for example, a double drum vibratory compactor, having a first compacting drum 14 and a second compacting drum 16 rotatably mounted on a main frame 18. The main frame 18 also supports an engine 20 that has a first and a second power source 22,24 conventionally connected thereto. Variable displacement fluid pumps or electrical generators can be used as interchangeable alternatives for the first and second power sources 22,24 without departing from the present invention.

The first compacting drum 14 includes a first vibratory mechanism 26 that is operatively connected to a first/inner and a second/outer motor 28,29. The second compacting drum 16 includes a second vibratory mechanism 30 that is operatively connected to a first/inner and a second/outer motor 32,33. The inner and outer motors 28,32 and 29,33 respectively are operatively connected, as by fluid conduits and control valves or electrical conductors and controls to the first power source 22. It should be understood that the first and second compacting drums 14,16 could have more than one vibratory mechanism per drum.

Figure 2:
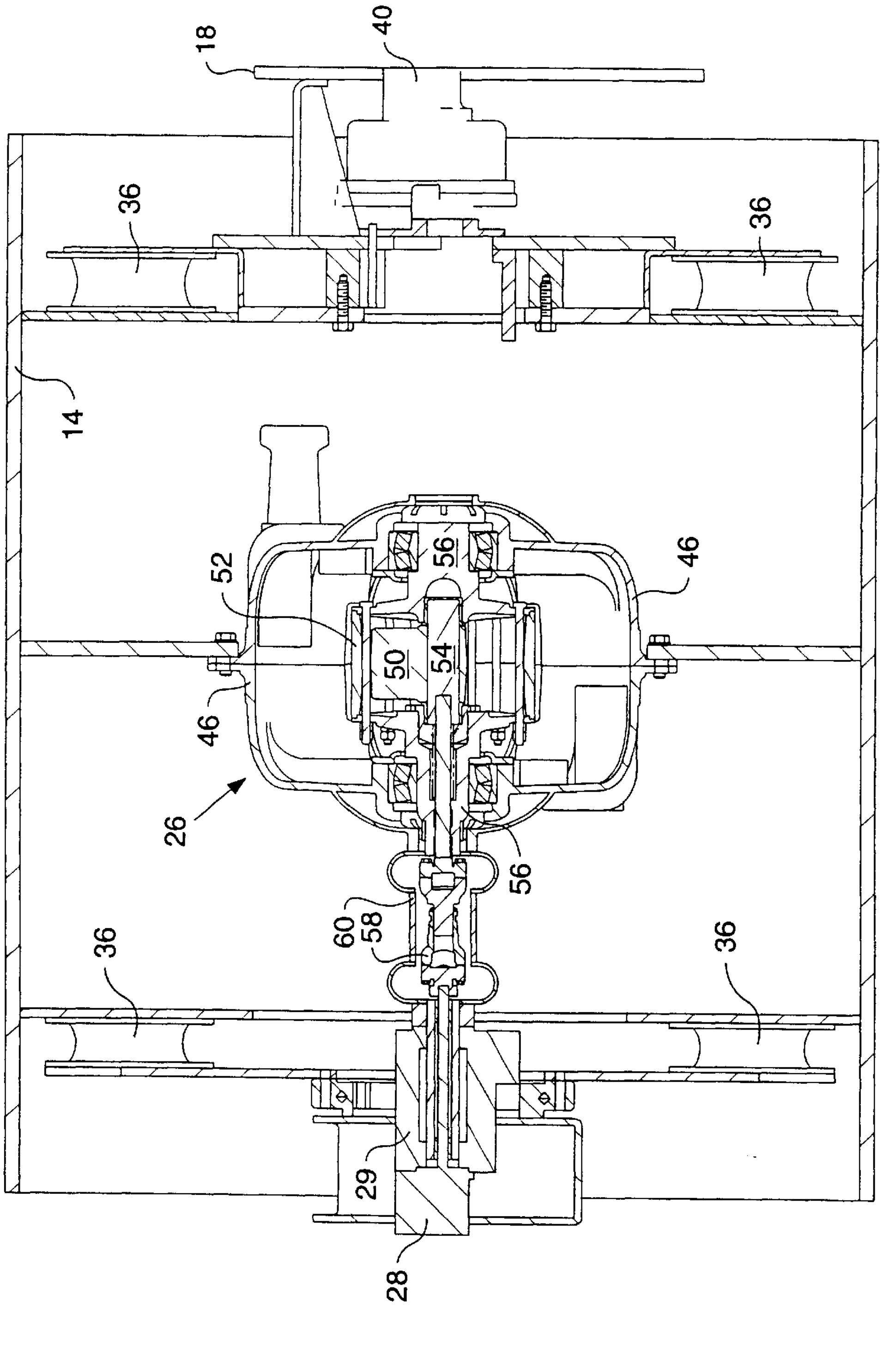
FIG. 2 shows an axial cross section view taken along line 2—2 through a compacting drum of the work machine of FIG. 1 embodying the present invention.

In as much as, the first compacting drum 14 and the second compacting drum 16 are structurally and operatively similar. The description, construction and elements comprising the first compacting drum 14, which will now be discussed in detail and as shown in FIG. 2, applies equally to the second compacting drum 16. Rubber mounts 36 vibrationally isolate the compacting drum 14 from the main frame 18. The first compacting drum 14 includes a propel motor 40 that is connected to the second power source 24. For example, the propel motor 40 is connected to the main frame 18 and operatively connected to the first compacting drum 14 in a known manner. The second power source 24 supplies a pressurized operation fluid or electrical current, to propel motor 40 for propelling the work machine 10.

Referring now to FIG. 2, the vibratory mechanism 26 is contained within a housing 46 that is coaxially supported within the first compacting drum 26 in a known manner. The vibratory mechanism 26 includes a first/inner eccentric weight 50 and a second/outer eccentric weight 52. An inner shaft 54 supports the inner eccentric weight 50 and a pair of stub shafts 56 supports the outer eccentric weight 52. Motor 28 is connected to an inner drive shaft 58 that is connected to the inner shaft 54 and motor 29 is connected to an outer drive shaft 60 that is connected to the one of the stub shafts 56. The inner drive shaft 58 is shown as being a conventional cardan type drive shaft with universal joints and outer drive shaft 60 is shown as being a hollow tube type shaft with a rubber, tire-type flexible drive coupling 62 (see FIG. 3) at each end that allows flexibility and misalignment capabilities equal to the inner drive shaft 58. The flexible drive couplings 62 are of the split type so that the outer drive shaft 60 can be disassembled without removing the drum 14 from the work machine 10. With this structure, the drive shafts 58,60 are concentrically arranged. Motors 28,29 supply rotational power to the inner and outer eccentric weights 50,52 so as to impart a vibratory force on compacting drum 14.

Figure 3:
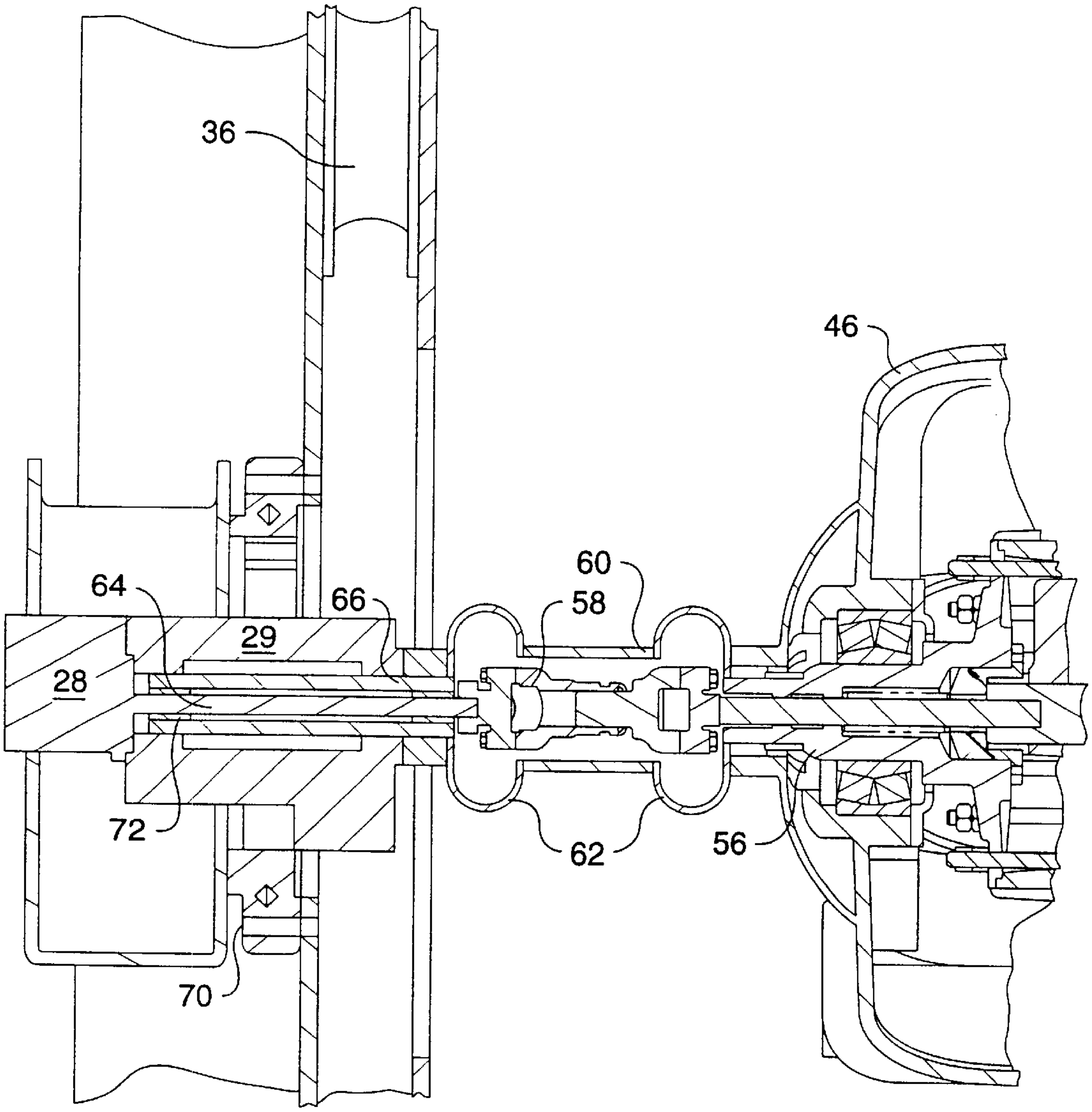
FIG. 3 is an enlarged sectional view of FIG. 2.
Figure 4:
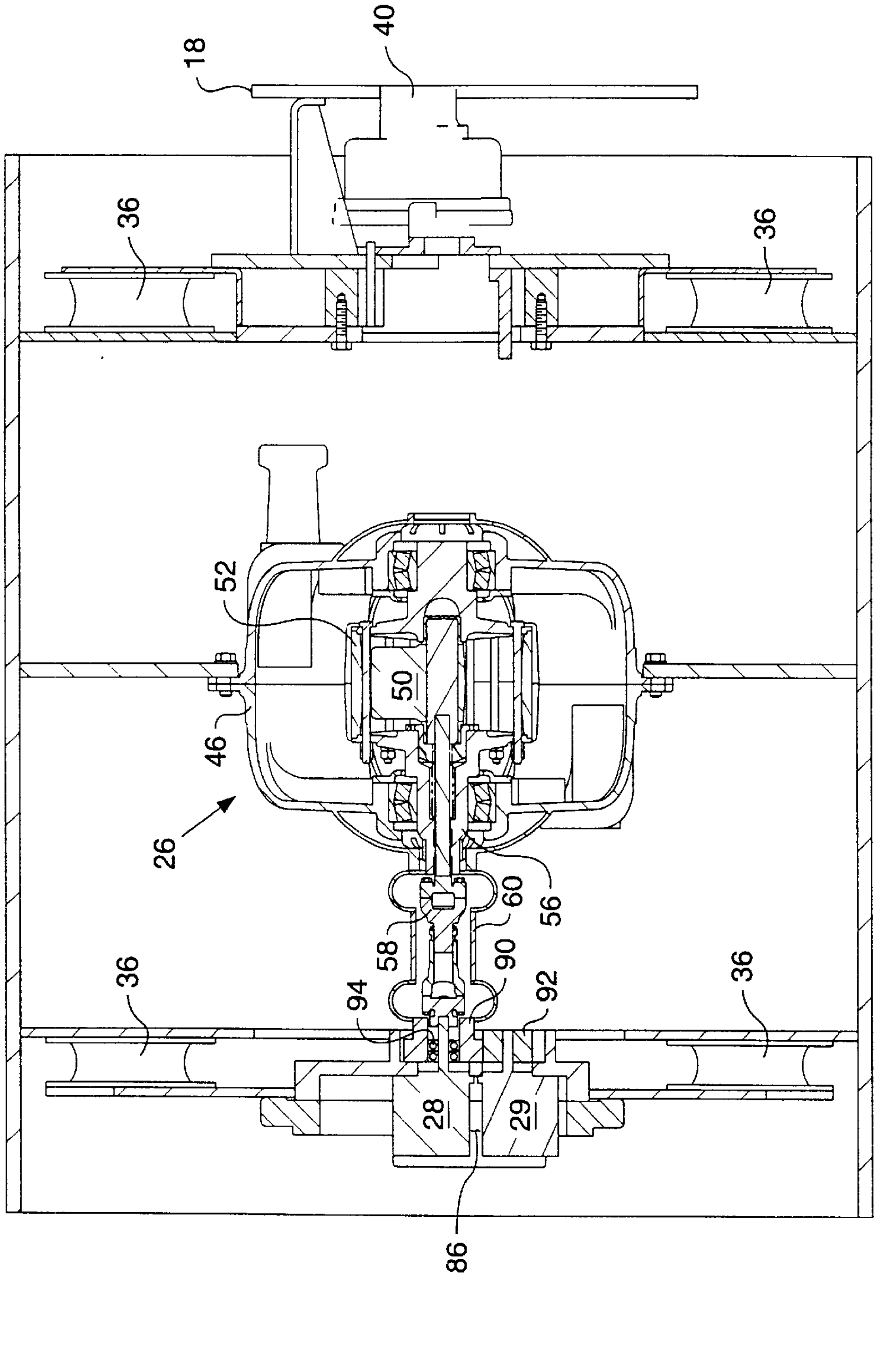
FIG. 4 is a sectional view of the drum assembly, showing another preferred embodiment having two fixed displacement motors.
Figure 5:
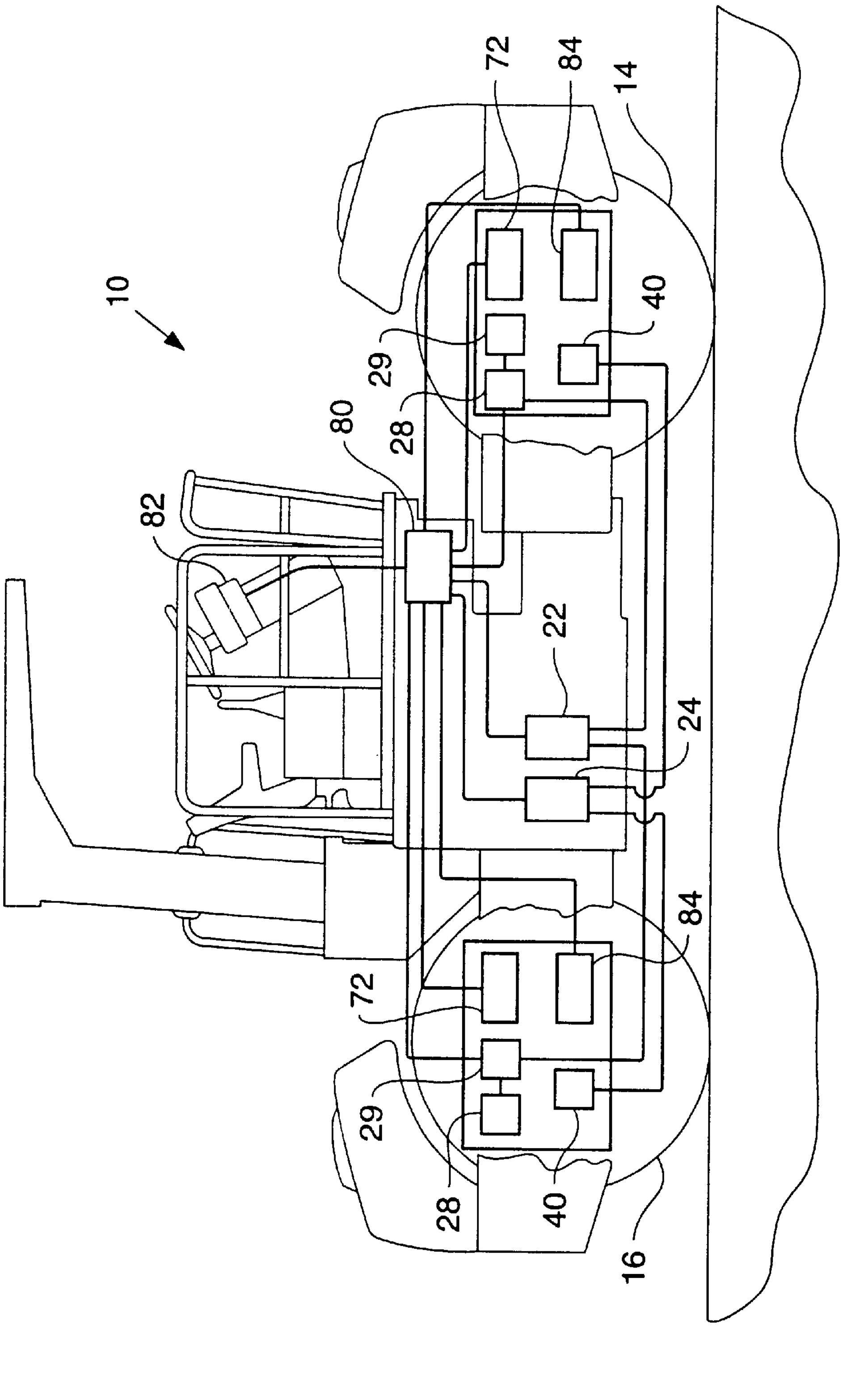
FIG. 5 is a system diagram.

Inner motor 28 is a fixed output motor and outer motor 29 is a continuously variable output motor (FIGS. 2 and 3). As an alternative both motors 28,29 are of the fixed output type (FIG. 4). Moreover, two variable output motors could be used if a fixed power source is provided. The inner and outer motors 28,29 may be hydraulic or electric motors.

With reference to FIGS. 2 and 3, the inner and outer motors 28,29 are arranged in tandem so that the variable output motor 29 (outer motor) is a hollow shaft type of motor, and output shafts 64,66 of both motors 28,29 extend from the same side so as to be concentric with each other. In particular, output shaft 64 of the inner motor 28 is disposed within an output shaft 66 of the outer motor 29. In this example, the inner drive shaft 58 of the inner eccentric weight 50 is connected to the output shaft 64 of the inner motor 28, and the outer drive shaft 60 of the outer eccentric weight 52 is connected to output shaft 66 of the outer motor 29. The variable output motor (outer motor) 29 may be controlled to have slightly more or less output than the fixed output motor (inner motor) 28. The inner and outer motors 28,29 are mounted to the drum 14 sidewall and are supported by turntable bearings 70.

The inner and outer motors 28,29 have a rotation sensing device 72 which is attached to the motors 28,29. The rotation sensing device 72 may alternatively be attached to the output shafts 64,66. Rotation sensing device 72 is defined as any of a number of known devices for monitoring rotational speed and relative position of the output shafts 64,66 of the inner and outer motors 28,29. Rotation sensing device 72 may be for example, a gear tooth type target having a tooth missing at one point and a proximity sensor that would sense the missing tooth. With this configuration, both the speed and position of the shaft can be determined with appropriate electronic sensing hardware. Specifically, the missing tooth is matched to the position of the corresponding driven eccentric weight. If the proximity sensor is aligned with the missing tooth, the inner and outer eccentric weights 50,52 are aligned; on the other hand, if the proximity sensor and the missing tooth are 180° apart, then the weights 50,52 are directly opposite.

The inner and outer motors 28,29 may be hydraulically or electrically connected in series, as is known in the art. This arrangement tends to force both motors to run at roughly the same RPM, except for reasons such as case leakage or variances in efficiency. Placing the motors 28,29 in series forces them to run at the same speed by manipulating one motor. Alternatively, the motors 28,29 could be arranged in parallel in known hydraulic or electrical arrangements to accomplish the same task.

Power source 22 and the inner and outer motors 28,29 are used in the example described herein, to allow for variable frequency vibration in addition to the variable amplitude vibration. A computer controller 80 is connected to the motors 28,29 and power source 22. The controller 80 controls the power source 22 and the variable output motor 29 via an operator interface 82. Operator interface 82 is defined as being any known device or combination of input devices such as touch screens, levers, rotary knobs, push buttons, joysticks and the like. The controller 80 monitors the speed and position of the output shafts 64,66 which directly relates to the inner and outer eccentric weights 50,52, via magnetic pick-up, optical, or other conventional means. The controller 80 may also monitor engine speed and other inputs such as drum acceleration via an accelerometer 84, if desired.

For double drum compactors, two pumps may be preferable, one for each drum. Alternatively, a single pump may be used for two drums, but it is not as preferable to arrange four motors are arranged in series, as would be required in this approach.

Power source 24 drives the propel motor 40 so as to drive the drums 14,16 to thereby cause the vibratory compactor machine 10 to travel in a forward or rearward direction.

In the alternative embodiment illustrated in FIG. 4, the inner and outer motors 28,29 are arranged adjacent to each other, instead of being in tandem. In this embodiment, both motors 28,29 are fixed output motors, wherein one motor has a slightly larger output than the other motor. Alternatively, one of the motors 28,29 does not have to be larger than the other. In the event of a hydraulic power source and motor a bleed-off valve 86 is located between the motors to cause them to run at the same RPM.

The motors are connected to drive respective inner and outer drive shafts 58,60 that are arranged to be concentric, so that drive shaft 58 is assembled within driveshaft 60. The output shaft 66 of the second motor 29 is connected to driven gear 90 and drive gear 92, respectively. The driven gear 90 is concentrically disposed about the output shaft of the first motor 28. Driven gear 90 is mounted on bearings 94, and the drives the outer driveshaft 60 and outer eccentric weight 52.

The driven gear 90 and the drive gear 92 may be the same or different sizes with respect to each other, wherein the drive gear size influences the speed of the respective driveshafts 58,60.

INDUSTRIAL APPLICABILITY

During use of the vibratory compactor machine 10, an operator actuates the power source 24 so that the drum 14,16 rotates around in the direction of desired travel. Rotating the drum member 14,16 in this manner causes the work machine 10 to move in a forward or reverse direction over the material to be compacted.

At start up, before actually driving the work machine 10 onto the mat 12 to be compacted, the operator requests vibration from the interface 82. This causes the controller 80 to command the power source 22 to slowly increase to full output. This may take some time for example, about 10 seconds.

While the inner and outer motors 28,29 are accelerating, the controller 80 monitors the speed and position of the inner and outer drive shafts 58,60 and either increases or decreases the output of outer motor 29 to ensure that the inner and outer eccentric weights 50,52 remain 180° out of phase (no amplitude or low amplitude). This ensures that the vibratory mechanism 26 can come up to speed without passing through a resonant phase and causing unnecessary wear and tear to the work machine 10.

When the weight inner and outer drive shafts 58,60 have reached the desired RPM, the controller 80 changes the output of the outer motor 29 to increase the amplitude to the desired level. At the highest amplitude, normally used during the first passes, the RPM of the inner and outer eccentric weights 50,52 may be reduced to keep bearing loads within their design limits. The controller 80 may reduce the output of power source 22 to accomplish this feature.

As the surface being compacted becomes denser, the drum 14,16 will begin to de-couple. The controller 80 senses this phenomenon via accelerometers 84 and commands the outer motor 29 to change the amplitude and increase the output of power source 22, to thereby increase the rotational speed/frequency of the vibratory mechanism 26. Known control theories and hardware have been developed by companies, such as Geodynamik, to provide a compaction indicator combined with a compactor control system to achieve this function.

At the end of each pass, the controller 80 drives the outer motor 29 to return the outer eccentric weight 52 to be 180° out of phase with the inner weight 50 to achieve a zero (or almost zero) amplitude. A three-position switch (not shown) may be provided with the operator interface 82 for the operator to control the amplitude settings. The three-positions may include: (1) everything off, no shafts turning; (2) vibrators running at speed but at zero amplitude; and (3) vibrators running at speed and at maximum amplitude permissible for the conditions.

If a hydraulic system is used, all of the above functions for the outer motor 29 can be achieved by switching the bleed-off valve 86, as shown in FIG. 4, to one of three positions. These three positions include: (1) a normal position so that a small orifice allows a small amount of oil to escape which in effect makes the inner and outer motors 28,29 behave as if they are nearly the same displacement, despite a predetermined difference in displacement; (2) a position so that a more open passage quickly dumps oil from between the inner and outer motors 28,29 and has the same effect as increasing the displacement of the outer motor 29, i.e., the speed of the drive shaft 60 slows down; or (3) a completely blocked position which has the same effect as the outer motor 29 decreasing in displacement.

The present invention provides for the inner and outer eccentric weights 50,52 to be positioned in continuously variable positions, and thus, continuous amplitude levels, by adjusting the inner and outer motors 28,29 to drive the inner and outer eccentric weights 50,52 independently of each other.

Shown and described are several embodiments of the invention, though it will be apparent to those skilled in the art that many changes and modifications may be made without departing from the invention in its broader aspects. For instance, the present invention may be utilized in a plate-type compactor wherein the overall pod assembly would be bolted to a structure extending from the plate and the pod would be on top of the plate. Therefore, it is intended that the appended claims cover all such changes and modifications as fall within the true spirit and scope of the invention.

What is claimed is:

1. A vibratory mechanism, comprising:

a first eccentric height rotatably supported within a housing;

a second eccentric weight being coaxially rotatable with said first eccentric weight; and a first motor connected with said first eccentric weight;

a second motor connected with said second eccentric weight; and wherein said first and second motors are positioned on the same side of the vibratory mechanism and one of said first and second motors is operable to change a phase difference between said first and second eccentric weights.

2. The vibratory mechanism of claim 1, wherein said first and second motors are arrange in tandem and include concentric output shafts.

3. The vibratory mechanism of claim 1, wherein said first motor is positioned adjacent to said second motor.

4. The vibratory mechanism of claim 3, wherein an output shaft of said second motor is connected with a drive gear and a driven gear, said driven gear being concentrically disposed about an output shaft of said first motor.

5. The vibratory mechanism of claim 1, including inner and outer drive shafts provided in a concentric manner, wherein said inner drive shaft connects said first motor to said first eccentric weight and said outer drive shaft connects said second motor to said second eccentric weight.

6. The vibratory mechanism according to claim 1, wherein one of said first and second motors is a variable output motor, and the other one of said first and second motors is a fixed output motor.

7. The vibratory mechanism according to claim 6, including a controller operatively connected to said first and second motors.

8. The vibratory mechanism according to claim 7, wherein said controller operatively indexes one of said first and second eccentric weights relative to the other of said first and second weights by changing an output speed of a one of said first motor and said second motor.

9. The vibratory mechanism of claim 7, including a rotation sensing device connected to said controller, for detecting the phase difference of said first and second eccentric weights.

10. A vibratory mechanism according to claim 1, wherein said first and second motors are fixed displacement motors, and a fluid bleed-off valve is provided between said first and second motors.

11. A vibratory mechanism according to claim 10, wherein said one of said first and second motors has a larger displacement than the other one of said first and second motors.

12. The vibratory mechanism according to claim 10, including a controller operatively connected to said first and second motors.

13. The vibratory mechanism according to claim 12, wherein said controller operatively indexes one of said first and second eccentric weights relative to the other of said first and second weights by changing an output speed of one of said first motor and said second motor.

14. The vibratory mechanism of claim 13, including a rotation sensing device connected to said controller for detecting the phase difference of said first and second eccentric weights.

* * * * *

UNITED STATES PATENT AND TRADEMARK OFFICE
CERTIFICATE OF CORRECTION

PATENT NO. : 6,637,280 B2
DATED : October 28, 2003
INVENTOR(S) : Dean R. Potts

It is certified that error appears in the above-identified patent and that said Letters Patent is hereby corrected as shown below:

Column 5,
Line 61, delete “height”and insert -- weight --

Column 6,
Line 12, delete “arrange” and insert -- arranged --

Signed and Sealed this

Thirtieth Day of December, 2003

JAMES E. ROGAN
*Director of the United States Patent and Trademark Office*